(12) United States Patent
Berthold

(10) Patent No.: US 7,786,866 B2
(45) Date of Patent: Aug. 31, 2010

(54) RADIO FREQUENCY IDENTIFICATION (RFID) SYSTEM THAT MEETS DATA PROTECTION REQUIREMENTS THROUGH OWNER-CONTROLLED RFID TAG FUNCTIONALITY

(75) Inventor: Oliver Berthold, Berlin (DE)

(73) Assignee: SAP AG, Walldorf (DE)

( * ) Notice: Subject to any disclaimer, the term of this patent is extended or adjusted under 35 U.S.C. 154(b) by 983 days.

(21) Appl. No.: 11/580,689

(22) Filed: Oct. 13, 2006

(65) Prior Publication Data

US 2007/0103274 A1 May 10, 2007

Related U.S. Application Data

(63) Continuation of application No. PCT/DE2005/000648, filed on Apr. 13, 2005.

(51) Int. Cl.
 *G08B 13/14* (2006.01)
(52) U.S. Cl. ............... 340/572.1; 340/5.8; 340/5.85; 340/5.92; 340/10.1; 340/572.4; 235/385
(58) Field of Classification Search ............ 340/572.1, 340/10.1, 5.92, 5.85, 5.8, 572.4; 235/385; 707/999.102
See application file for complete search history.

(56) References Cited

U.S. PATENT DOCUMENTS

| | | | | |
|---|---|---|---|---|
| 6,104,333 A | * | 8/2000 | Wood, Jr. ............... | 340/10.4 |
| 6,917,945 B2 | * | 7/2005 | Vicars-Harris ............ | 1/1 |
| 7,357,318 B2 | * | 4/2008 | Honda ................. | 235/385 |
| 7,372,364 B2 | * | 5/2008 | Mercer et al. .......... | 340/572.1 |
| 7,471,199 B2 | * | 12/2008 | Zimmerman et al. ...... | 340/572.1 |
| 2006/0289639 A1 | * | 12/2006 | Shafer ............... | 235/435 |
| 2008/0094220 A1 | * | 4/2008 | Foley et al. ........... | 340/572.4 |
| 2008/0169909 A1 | * | 7/2008 | Park et al. ............ | 340/10.4 |

* cited by examiner

*Primary Examiner*—Davetta W Goins
(74) *Attorney, Agent, or Firm*—Brake Hughes Bellermann LLP

(57) ABSTRACT

An RFID tag can include a transmitting device and a receiving device for transmitting data to and receiving data from a tag reader, and the tag can include a memory for storing identification data unambiguously labeling the RFID tag and circuitry which automatically executes functions depending on the fact that: the reader demonstrates knowledge of an internal password in a memory of the tag; and information stored in the memory of the tag for an internal state permits the execution of the function. The tag also includes circuitry for changing the stored password and/or the internal state, in particular depending on a previous comparison of the internal password to one received from the reader.

21 Claims, 3 Drawing Sheets

Fig. 2   RFID tag with secure password verification

RADIO FREQUENCY IDENTIFICATION (RFID) SYSTEM THAT MEETS DATA PROTECTION REQUIREMENTS THROUGH OWNER-CONTROLLED RFID TAG FUNCTIONALITY

CLAIM OF PRIORITY

This application is a continuation application of, and claims priority to, International Application Number: PCT/DE2005/000648, filed on Apr. 13, 2005, the entire contents of which is hereby incorporated by reference.

TECHNICAL FIELD

This description relates to RFID (Radio Frequency Identification) systems and, in particular, to RFID systems that meet data protection requirements through owner-controlled RFID tag functionality.

BACKGROUND

RFID tags and the necessary infrastructure, such as, for example, readers, can be used for labeling objects. RFID tags can include a transmitting and receiving device with which the tag, among other things, can transmit a label (e.g., identification data) to a reader and can execute other functions ordered (i.e., "called") by the reader as soon as an RFID tag is within effective range of the reader.

The label can serve for the identification of the RFID tags and thus identification of an object associated with the tag. In the near future these RFID tags may replace the barcodes used on many consumer products to simplify the logistics processes as well as the processes in the supermarket. For example, self-operating cash registers are planned since a shopping cart's contents provided with RFID tags can be completely scanned in one step.

Privacy issues exist with RFID technology. For example, because each RFID tag should bear a unique serial number, the path of each consumer product (e.g., each individual object) can be read out unnoticed, even after leaving the supermarket. Thus, people can be tracked with the aid of these serial numbers and in addition can be scanned by anyone with regard to all the products they are carrying with them (for example, their clothing). Should these data, as is at least to be feared, be collected, stored with the aid of databases, and evaluated, the scenario of "glass people" feared by data protection personnel and privacy activists may become a reality.

Previously, the industry countered this issue with a so-called kill function, in which the RFID tags, e.g., after the customer paid for the associated items at the supermarket, were permanently deactivated. Unfortunately, the permanent deactivation of the RFID tags prevents a number of applications. In particular, applications are affected that normally come into use only after the purchase of a product, such as, for example, an intelligent washing machine that automatically determines the washing temperature and program for washing clothes based on the identity of articles of clothing put into the washing machine, which identity can be determined based on the RFID tags associated with the clothing. RFID tags that make such a kill function available are described in the EPC-global specifications, version 1.0, of the EPCglobal community, which is accessible at www dot epcglobal dot com.

SUMMARY

The invention solves the described privacy problem of the previous RFID technology and at the same time, unlike the known kill function, makes possible further use of the technology for intelligent (e.g., networked) devices with an RFID tag and/or a reader.

In this description, reference is made repeatedly to the example that products can be distinguished through use of an RFID tag. This example is merely a typical application, and those skilled in the art will recognize that other uses of the RFID technology are also conceivable.

The functionality of the RFID tags can be enhanced by dynamic activation, deactivation, or restriction of the (identification) functionality of the RFID tags. Specifically, it is meant thereby that with the aid of an internal state of the RFID tag it can be decided which functions an RFID tag executes, and to what extent, when a certain request from the reader is received. In particular, a state is provided in which the RFID tag outputs none of the internally stored data which customarily make identification possible.

However, in each state the RFID tag should fulfill the communication protocols that are valid between the reader and the RFID tag to the extent that transmitting and receiving of data and commands is possible.

For example, an RFID tag must signal its presence vis-à-vis a reader and participate in a so-called singulation or anti-collusion protocol in order to be able to receive individual commands. In the EPCglobal specifications an anti-collusion protocol is presented that runs without the use of the stored identifying data. Anti-collusion protocols are described in German Patent Publication No. DE 101 61 302 which are based on regularly regenerated random values instead of on identifying data.

In one implementation, the RIFD tag can provide a function for changing the internal state of the tag. This function is only executed after the reader calling the function has demonstrated knowledge of a secret data set, which can be, for example, a bit sequence stored on the RIFD tag. The secret data set is designated herein as a password. The detection function is designated herein as verification.

In another implementation, the RIFD tag can provide a rewritable, non-transient memory location for storing the password. Thus, the first password can be set during the production process of the RIFD tag or during connection of a product to the RIFD tag. The writing of the password may occur together with the writing of the identification data, since both the password and the identification data should be transmitted in each step of the logistics chain with the product.

Two useful developments of password verification are disclosed in the RFID system as follows.

In a first development, the password can be transmitted from the reader to the RFID tag to verify the password. This method of verification is very simple to implement on the RFID tag because only one function comparing the stored password with the received password is needed. However, the password can be determined by other devices by eavesdropping on the radio communication.

In a second development, a function can be available in the RFID tag as well as in the reader, which combines the password and an additional value to form a test value. In addition, a random number generator available in the RFID tag can generate a random value. The details of the random number generator for generating the random value are, in principle, arbitrary. For example, a noise source with a sampling circuit (e.g., a diode) can be used, or a hash function can be applied repeatedly to an initial value issued individually during production, and the random sequence can be formed from parts of the respective intermediate values. Calculating the test value can be performed in a variety of ways. For example, a cryptographically secure one-way function or a symmetric encryption function can be used, where one of the input values would be used as the key, since in this way reversing the function or the determination of an unknown third value from knowledge of the other two would be difficult or impossible.

A test value means also may carry out the calculation only on the basis of an input value, where either only the internal password is used or an additional arbitrary means is used to combine the input values. The options for realizing the test value means also include the possibility of carrying out the calculation on the basis of more than two input values. The options for realizing the test value means also include the possibility of calculating more than one output value.

In this method of verification the RFID tag may generate a random value, store the value in a memory, and transmit the random value to the reader. The reader can use the test value means, where the password and the received random value are used as input, and the reader can output a test value that is transmitted to the RFID tag. The RFID tag calculates a second test value with the aid of the stored password and the stored random value and compares both test values. If both test values agree, the function protected by the verification is executed.

Alternatively, the RFID tag can also reverse the calculation. That is, it can calculate from the test value and an input value another test value and compare it to the received test value. The advantage of the second development of the verification is the security against eavesdropping. The disadvantage is the higher complexity in the circuit technology of the RFID tag.

The security of the process, and the protection against the password being determined by third parties, depends on the cryptographic quality of the test value means (i.e., how difficult it is to reverse the one-way function or to determine the unknown value), the cryptographic quality of the random value generator, and the length of the bit sequences used for the password, the random value, and the test value.

Furthermore, in one implementation the RFID tag provides a function for changing the password, which may be executed only after successful verification of the previous password. Therein, the new password can be transmitted from the reader to the RFID tag.

Two useful developments of the transmission of a password from the reader to the RFID tag of the RFID system are disclosed as follows.

In the first development of the password transmission the new password can be transmitted from the reader to the RFID tag. An advantage of this development is that it is simple to implement on the RFID tag. However, eavesdropping by another device is also possible.

In the second development of the password transmission, there can be, in the RFID tag as well as in the reader, circuitry that can calculate from two input values a third value. The calculation must be reversible to the extent that the second input value can be calculated from the first input value and the output value. For example, arbitrary symmetric encryption functions or the bitwise XOR superposition of the two input values can be used. The calculation also can be carried out on the basis of more than two input values, and more than one output value can be calculated.

An advantage of this development is greater security against eavesdropping, however, higher complexity in the circuit technology of the RFID tag is required. The security of the process depends on the cryptographic quality of the means used and on the length of the values used, where the simple bitwise XOR superposition (one-time pad) already offers maximum security and is thus optimal.

So that the password or the state of the RFID tag can be changed, it is necessary for the current owner of an RFID tag to know the current password. In contradistinction to the previous realization on the basis of kill functions (e.g., as according to the EPC Standard), the password can be passed, e.g., at or after the cash register, to the customer (for example, by printout on the receipt). Thereby, the customer gets complete control over the functionality of her/his RFID tag.

By changing the password the current owner can take over sole control of the functionality of an RFID tag, since the previous owners have then stored an incorrect password in their data bases.

In another implementation, an advantageous process for changing the passwords can allow for identification of the RFID tags that are in the deactivated state and whose passwords thus cannot be determined. Thus, an owner can store the same password in all the RFID tags in her/his possession prior to deactivation of the RFID tags. This process can occur, for example, when the new owner takes possession of the objects to which the RFID tags are attached, e.g., at the supermarket register.

When the ownership of an RFID tag changes, e.g., at the register of a supermarket, several events may occur. First, the previous owner may change the password of the RFID tag to be transferred to a randomly chosen value. On transfer of the object and its associated RFID tag the old owner communicates the password used to the new owner. Second, the new owner carries out, in so far as possible outside of radio range (e.g., in her/his confidential area) a second change of password, where the new owner customarily uses a password common to all her/his RFID tags.

Thus, when an item is purchased at a supermarket register the following steps may occur: 1) a random value is chosen as the new password by the reader; 2) the identification of an RFID tag is read out; 3) the password of the RFID tag is changed to the new value, and the reader receives the currently necessary previous password by querying a data base, e.g., the product inventory data base of the supermarket; 4) the RFID tag is deactivated; 5) if additional RFID tags are present, step 2 is repeated; and 6) the password for this purchase is submitted to the new owner of the products, e.g., by printing on the cash register receipt or by transmitting to a device in the possession of the customer (for example, a chip card).

So that all the RFID tags in the possession of a person/a household have the same password, the change of password should be repeated by a reader in the confidential area of the person. In so doing, a similar sequence of steps can be used with the difference that step 1 is only carried out once and the password stored once in the device is used for all the RFID tags. The previous password, necessary in step 3, is available to the user through step 6 of the previous change of password and must be, in certain cases, transmitted to the reader. Step 6 can be omitted.

Three possibilities are proposed for how the intermediate password can be communicated to the user. First, the password can be transmitted to any electronic device in the possession of the customer (for example, a cellular telephone). Second, the password can be transmitted directly to the in-house system of the customer (in particular for long-distance selling/ordering by internet). Third, the password can be printed on the cash register receipt. The third possibility could be particularly important in a startup phase of the technology if only a few customers have intelligent household devices. One could, so to speak, migrate important RFID tags retroactively when such a device is acquired. On the other hand, in this way, purchase is possible without the electronic device that stores the passwords.

In another implementation, the change of owner is done only by transfer of the previous password. This possibility is, under certain circumstances, practical at the supermarket cash register since the RFID tags are assigned an individual password during production. However, this process is not to be recommended for transmitting from one confidential area to another since in this case the password common to all RFID tags of the previous owner would have to be communicated to the new owner.

The above-described privacy problems of RFID technology, which relate to all the processes of the RFID tag after leaving the supermarket, can be obviated by techniques and structures described herein since deactivated RFID tags identify themselves only with respect to authorized scanners.

Through the password-based possibility for restricting access to the RFID tag functionality it is achieved, among other things, that an RFID tag can only be completely controlled by verified readers. By changing the password the control of the RFID tag can be restricted to the current owner. In addition, the owner can arbitrarily restrict access by unauthorized parties. Thus, the following exemplary restrictions would be conceivable:

Complete anonymization: An unverified reader receives no part of the label, that is, the RFID tag is not identifiable.

Anonymization of the serial number of an object: RFID tags can be used so that they output only a product code component of an EPC (electronic product code), even though the EPC can include both a product code and a serial number of the individual object. Thus, the identity of the particular object of the product remains concealed.

Anonymization of the identification number but disclosure of other information: The output of the identification number can be restricted to verified readers but arbitrary other information that can be changed by a verified reader, callable via additional functions, is generally available. This makes it possible, for example, to structure recycling information concerning the chemical components in such a manner that it is readable or for information concerning packaging required for deposit in automatic return devices.

An additional useful development provides for calculating a test value from two input values. For example, a cryptographic hash function (one-way function) or a symmetric encryption function can be used for the calculation. With the aid of a challenge-response process and with the cooperation of the RFID tag or product manufacturer, the authenticity of the RFID tag, and thus with restrictions also the authenticity of the product, can be checked.

Thus, it is possible to produce freely programmable RFID tags, for reasons of product technology nearly all the RFID tags are permitted to be produced without concrete identification numbers and instead they only receive their first and final programming on the product. RFID tags without verifiable identification numbers will thus make corruptions of the product easier rather than more difficult.

For this development, in the RFID tag along with the password an additional secret value must be stored that can be stored in a non-rewritable memory. In addition, the computer system of the product or RFID tag manufacturer must be able to repeat or reverse the calculation of the RFID tag. In addition, the reader generally needs an online-connection to the computer system of the manufacturer. The manufacturer furthermore needs a database that stores, for each RFID tag, at least the identification number and the secret value also stored in the RFID tag.

In an implementation, the reader can transmit a random value to the RFID tag. The RFID tag can calculate the test value, where the random value and the secret value stored in the RFID tag are used as input. The test value can be transmitted back to the reader. The reader can transmit the combination of RFID tag identification data, the random value, and the test value to the manufacturer. The manufacturer then can test the correctness with the aid the secret value stored in its data base for the queried RFID tag. In so doing, two of the three values (i.e., the random value, the test value, and the secret value of the RFID tag) are used as input values and the result compared to the third value. The manufacturer reports the result of the comparison to the reader.

In another useful development of the process, the reader has already received in advance one or more valid combinations of the random value and the test value for a certain RFID tag. The testing of the authenticity of the RFID tag can then be done locally without an online connection being necessary by the random value contained in the combination being transmitted to the RFID tag and the reply of the RFID tag being compared to the test value.

Components of the application can include (networked) readers with the following particular functionalities: a function for verifying (transmitting the password or execution of the challenge-response process and the corresponding means for detecting knowledge of the password); calling the function after verification of the password; a function for changing the state of the RFID tag; a function for changing the password; a method of storing the common password and only forwarding to other devices known to be trustworthy; a method of taking possession of new RFID tags by specification of the current passwords by changing the passwords to the common password.

The invention is not restricted to the above-specified example embodiments. Rather, many variants are conceivable which make use of the teaching even with embodiments of a fundamentally different type.

DETAILED DESCRIPTION

Figure 1:
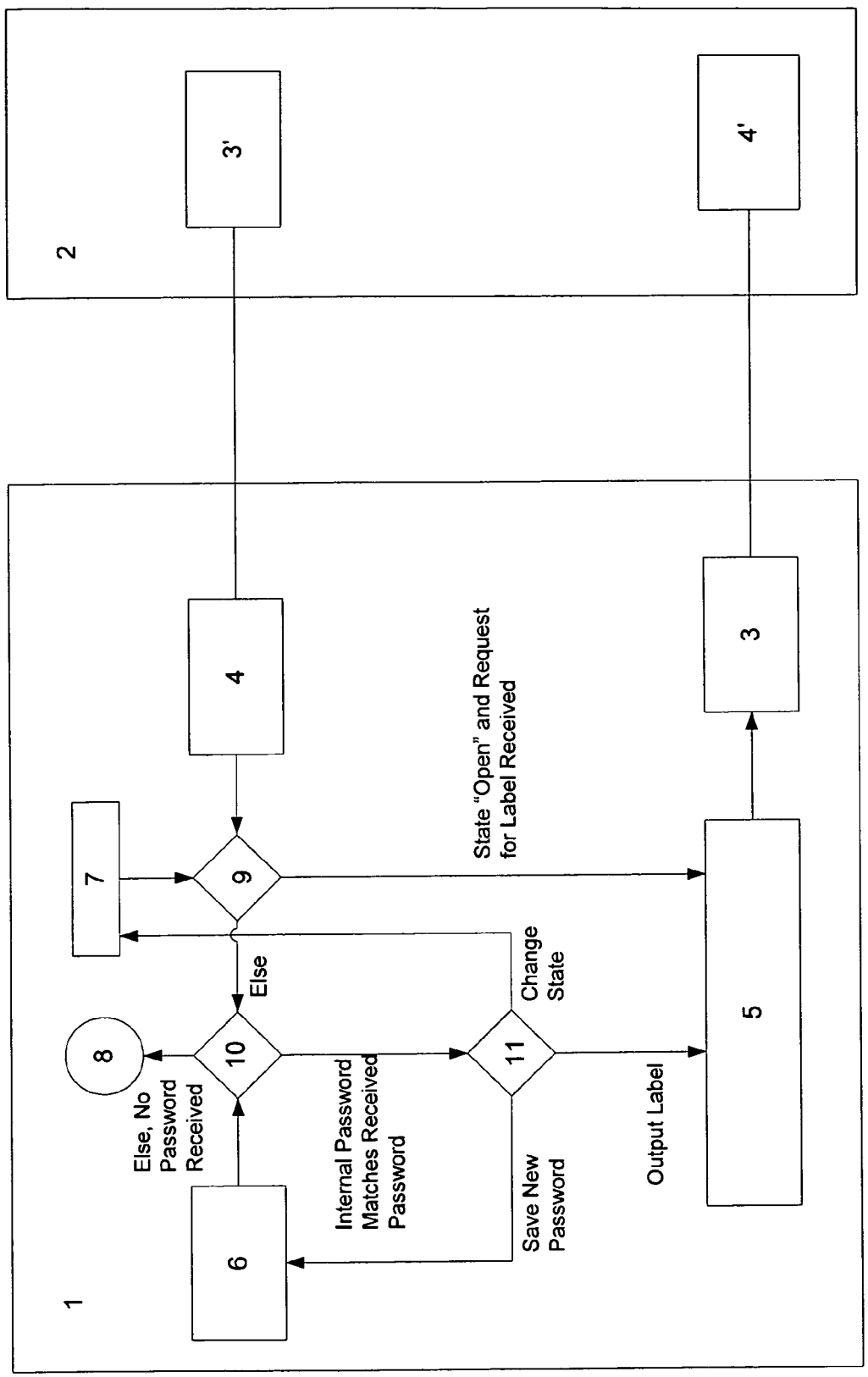
FIG. 1 is a schematic flow chart of the data flow in an RFID tag while in cooperation with a reader.

In FIG. 1 an RFID tag 1 includes a memory 5 that can store an unambiguous label for the tag itself. With this label the tag can be unambiguously distinguished from all other tags. The RFID tag 1 also can include a memory 6 that can store an internal password and a memory 7 that can store the internal state of the tag that specifies whether or not certain functions can be executed.

During operation the RFID tag 1 can interact with a reader 2. The RFID tag 1 and the reader 2 each can include a transmitter 3, 3' and a receiver 4, 4', respectively, for transmitting and receiving data that can be thoroughly different from the standard. Individual queries involving the RFID tag 1 and the reader 2 are explained separately with respect to FIG. 3, so that reference is made thereto.

First, a query for a label can be directed from the reader 2 to the RFID tag 1. Alternatively or in addition, a password can be specified. In a comparator 9 an internal state of the RFID tag 1 can be checked. Whether the internal state is "open" or "blocked" can be checked, and the state can be stored as a flag in the memory 7. If the RFID tag is "blocked," the unambiguous label stored in the memory 5 is only output to authorized readers 2 that demonstrate knowledge of an internal password stored in the memory 6.

Figure 2:
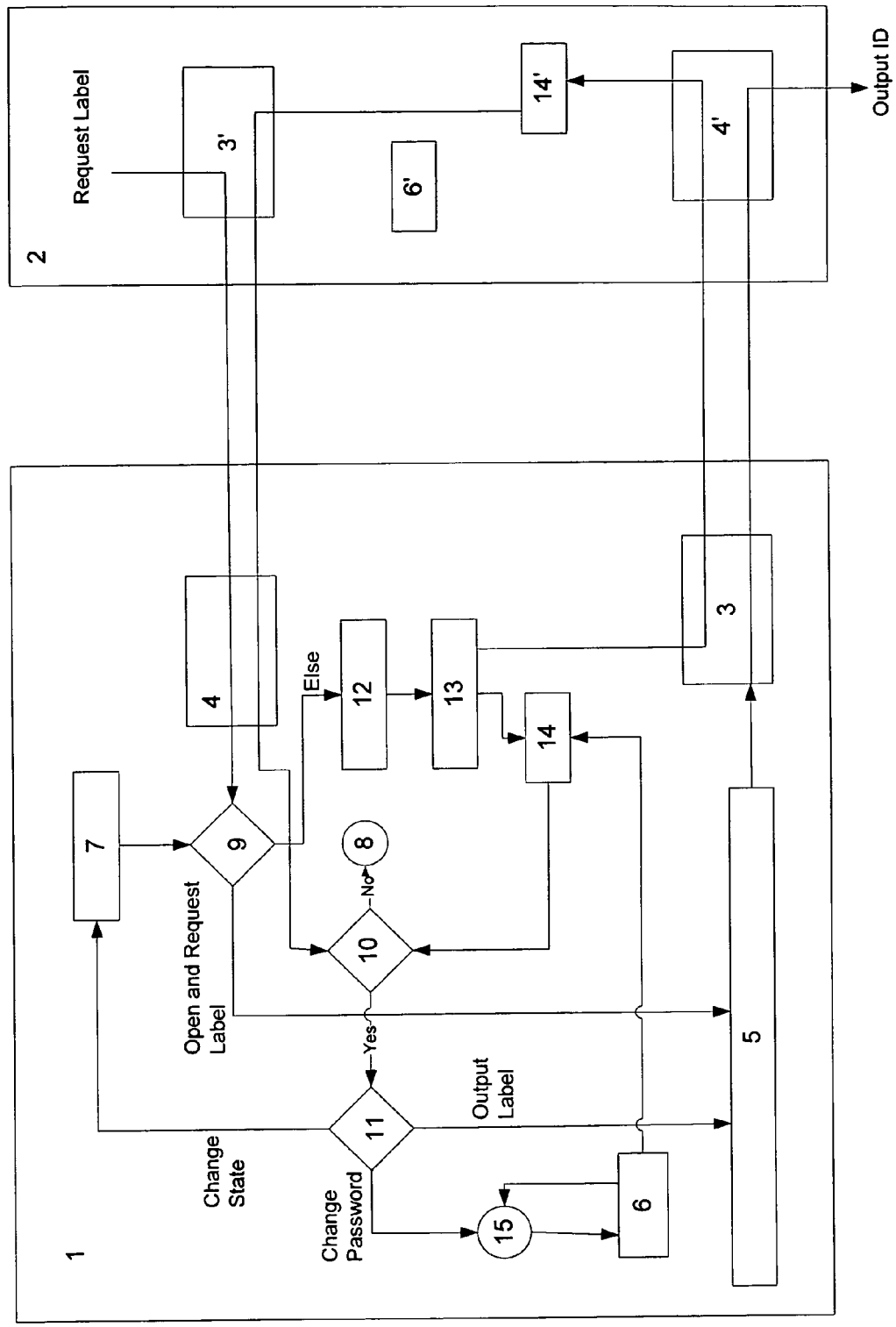
FIG. 2 is a schematic flow chart of the data flow in an RFID with secure password verification.

In another comparator 10 the internal password can be compared to a password, which in certain cases can be read in from the reader (e.g., reader password 6', shown in FIG. 2). If no password was read in from the reader 2 or if the passwords do not agree, then the process terminates with the final state 8. Optionally, an error message can be output.

If the internal password and the received password agree, the function requested by the reader 2 can be executed. By means of a branching device 11 it can be decided whether: the unambiguous label from memory 5 is output; the internal state in memory 7 is changed; and/or a new internal password is stored in the memory 6. In making these decisions, it is important that each value stored in an RFID tag 1, which is in the position to identify unambiguously the object to which the RFID tag is attached and therefore turns out to be different in each object, represents an unambiguous label 5 for the RFID tag 1. The sequence of comparisons can be carried out in arbitrary order, and the checking of the internal state can be omitted in all the queries except after the labeling. Furthermore, it is possible as an alternative in the final state 8 to send an error message or the like to the reader 2. In principle, it is arbitrary whether and how the state or password changes are sent back to the reader 2. Also, the combination of the Change Password and Block State function calls can be protected.

FIG. 2 shows the RFID tag 1 with all the functions represented in FIG. 1 so that reference can be made to the description above. However, the password verification is done in a particularly secure manner. This then happens in two steps: a) first the function is called; and b) thereafter (if the RFID tag 1 is blocked) a random value is sent with which the reader sends the password in an encrypted format, and if successful the previously requested function is executed. This is represented in detail in the following.

In a modification of the embodiment described in FIG. 1 an altered processing can occur here in the comparator 9. If the internal state (e.g., as stored in memory 7) is blocked, then a random number generator 12 can be addressed which generates a random value that is stored in a buffer 13. Subsequently, this random value can be sent to the reader 2 via the transmitter 3. In parallel, this random value can be processed, together with the internal password from memory 6, by a test value means 14. The test value means 14 calculates from these data a unique test value.

The reader 2 has, in principle, the same information, namely, a reader password 6' and the received random value. With a test value means 14' of comparable construction a test value is also determined in the reader 2 and transmitted to the RFID tag 1.

In the comparator 10 a comparison between the test value generated by the RFID tag 1 and the test value generated by the reader 2 can be carried out. If the test values agree, then the further processing with the branching device 11 takes place as described in FIG. 1. If the test values do not agree, then termination occurs analogously to FIG. 1. Furthermore, circuitry 15 for changing the internal password is provided in the memory 6. This circuitry can generate a new internal password from the previous internal password and a value received by the reader 2. The branching device 11 outputs in this case a corresponding command. Thus, the RFID tag 1 can query the password if this is required.

Figure 3:
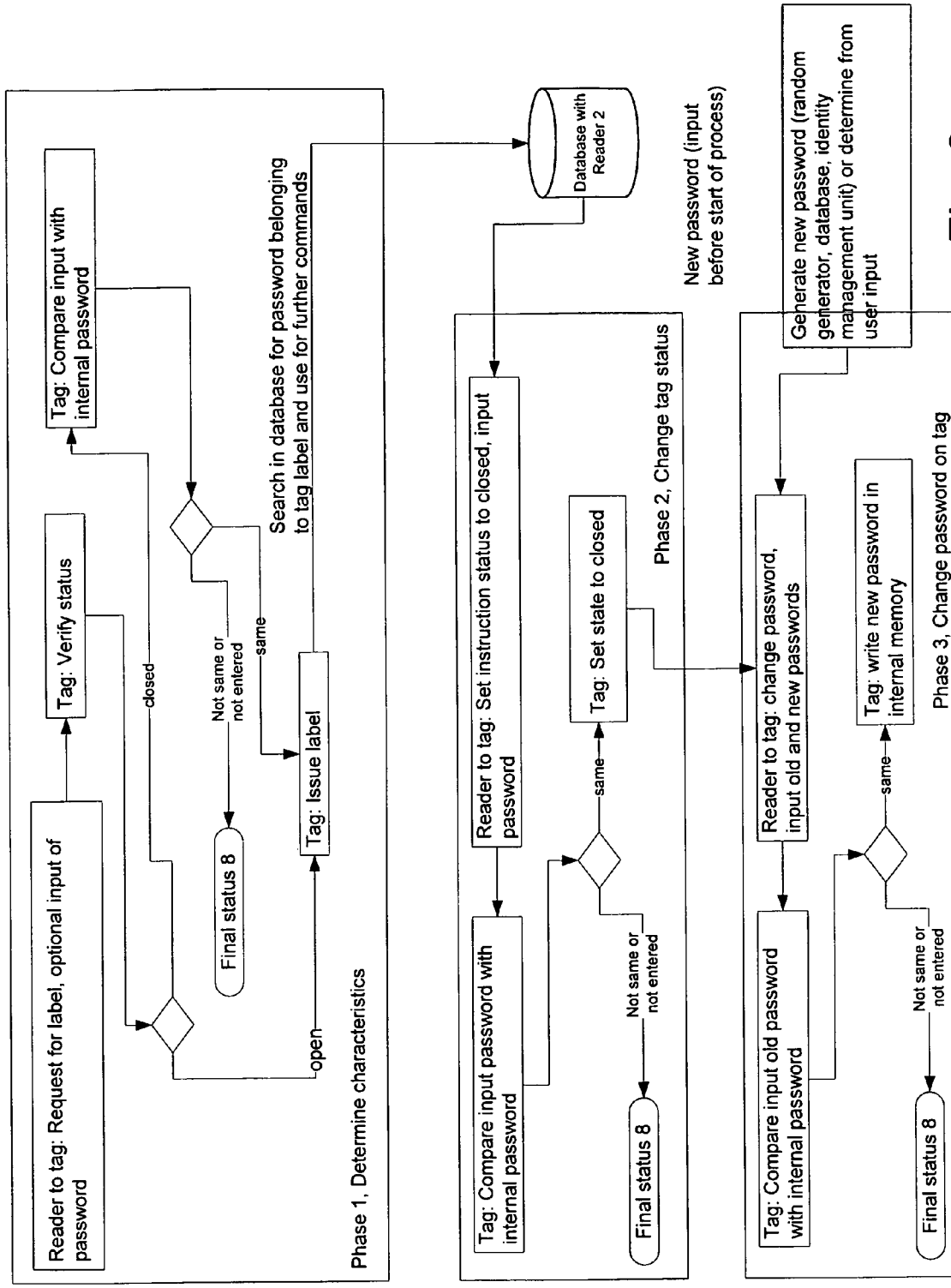
FIG. 3 is a flow chart of a process described herein.

FIG. 3 shows the sequence of a process with the apparatus shown in FIG. 1 and FIG. 2. Therein a query of the unambiguous label and a subsequent change of password (for acceptance by the owner) and a following block of the internal state of the RFID tag is described. With this process an electronic owner acceptance is possible. The knowledge of the internal password of the tag has the same meaning as the status of the "owner."

What is claimed is:

1. An RFID tag comprising:
   a transmitter adapted to transmit data to an RFID reader;
   a receiver adapted to receive data from the reader;
   a memory adapted to store identification data that unambiguously identifies the RFID tag;
   a memory adapted to store an internal password;
   a memory adapted to store information about an internal state of the RFID tag;
   a controller adapted to automatically execute functions if the reader demonstrates knowledge of an internal password stored in the memory adapted to store the internal password or if information stored in the memory adapted to store information about the internal state permits the execution of the functions, and
   circuitry adapted to change the stored password and/or the internal state in response to a comparison of the internal password to a password received from the reader;
   a non-transient and non-rewritable or rewritable memory adapted to store a verification value, and
   circuitry adapted to determine a test value from two input values and adapted to verify the identification data based on a value received from the reader and the verification value, wherein the data that the transmitter is adapted to transmit to the RFID reader includes data containing information about a result of the verification.

2. The RFID tag of claim 1, wherein the memory adapted to store the internal password is a rewritable memory.

3. The RFID tag of claim 1, further comprising a first comparator adapted to compare the received value to a password stored in the memory adapted to store the password.

4. The RFID tag of claim 1, wherein the circuitry adapted to verify the identification data is adapted to perform a challenge-response function to verify the identification data.

5. The RFID tag of claim 1, further comprising a random number generator adapted to generate a random value.

6. The RFID tag of claim 5, further comprising a rewritable buffer adapted to buffer the random value.

7. The RFID tag of claim 6, further comprising circuitry adapted to answer a query from the reader to compare the stored password to the buffered random value and to transmit the random value to the reader.

8. The RFID tag of claim 7, further comprising a first comparator adapted to compare the received value to a password stored in the memory adapted to store the password,
   wherein the answer to the transmission is compared to the test value,
   wherein the two input values include the random value stored in the buffer and the internal password, and
   wherein the answer to the reader to the transmission of the random value and the test value is used as input for the first comparator.

9. The RFID tag of claim 1, further comprising a first comparator adapted to compare the received value to a password stored in the memory adapted to store the password, wherein, with a positive result from the comparator an internal password verification is evaluated as successful, otherwise as unsuccessful.

10. The RFID tag claim 1, wherein the internal state defines whether and which parts of the identification data are permitted to be output and wherein the transmitter is adapted to transmit at least parts of the identification data.

11. The RFID tag of claim 10, further comprising a second comparator adapted for transmitting only a part of the identification data.

12. The RFID tag of claim 10, wherein the circuitry adapted to change the stored password can be activated only if a previous password verification was successful, where in case of success the identification data can be transmitted completely.

13. The RFID tag of claim 10, wherein the circuitry adapted to change the internal state can be activated only if a previous password verification was successful, where in case of success the identification data can be transmitted completely.

14. The RFID tag of claim 1, further comprising circuitry adapted to calculate a new password from two input values, a received value, and the internal password.

15. An RFID reader comprising:
a transmitter adapted to transmit data to an RFID tag;
a receiver adapted to receive data from the tag;
circuitry adapted to detect a first password stored in the tag; and
circuitry adapted to query the tag for data stored in the tag,
wherein the transmitter is adapted to transmit a data value to the tag to be processed by the tag and to cause the first password stored in the tag to be changed and change an internal state of the tag, wherein the internal state of the tag determines what identification data stored in the tag is communicable from the tag to a reader.

16. The reader of claim 15, further comprising:
a memory adapted to store a second password in the reader; and
circuitry adapted to determine a test value from two input values.

17. The reader of claim 16, wherein the data value is the second password.

18. The reader of claim 16, further comprising circuitry adapted to:
receive a random value from the tag, generate a test value based on the random value and the second password, and transmit the test value to the tag;
query the RFID tag for identification data stored in the tag;
verify a password received from the tag and transmit a new password to the tag.

19. A method for an RFID reader to verify identification data of an RFID tag, the method comprising:
transmitting a random value from the reader to the tag;
receiving a first test value from the tag at the reader, wherein the first test value is generated by the tag in response to the random value;
transmitting the first test value, the random value, and the identification data to a manufacturer of the product associated with the RFID tag; and
receiving an answer from the manufacturer stating that the identification data is verified, wherein the answer is based on the transmitted first test value, the random value, and the identification data.

20. The method of claim 19, further comprising, prior to transmitting the first test value, the random value, and the identification data to the manufacturer:
requesting a valid combination of a random value and a second test value for identification data from the tag from the manufacturer; and
comparing the first test value to the second test value.

21. The method of claim 19, further comprising:
detecting, at the reader, a first password in the RFID tag; and
after receiving the answer from the manufacturer changing the password stored in the tag.

* * * * *